US005699431A

United States Patent [19]
Van Oorschot et al.

[11] Patent Number: 5,699,431
[45] Date of Patent: Dec. 16, 1997

[54] METHOD FOR EFFICIENT MANAGEMENT OF CERTIFICATE REVOCATION LISTS AND UPDATE INFORMATION

[75] Inventors: Paul C. Van Oorschot, Ottawa; Warwick S. Ford, Nepean; Stephen W. Hillier; Josanne Otway, both of Ottawa, all of Canada

[73] Assignee: Northern Telecom Limited, Montreal, Canada

[21] Appl. No.: 556,360

[22] Filed: Nov. 13, 1995

[51] Int. Cl.⁶ .................................................. H04L 9/30
[52] U.S. Cl. .................................................. 380/30
[58] Field of Search .................................. 380/30; 235/492

[56] References Cited

U.S. PATENT DOCUMENTS

| | | | |
|---|---|---|---|
| 4,200,770 | 4/1980 | Diffie et al. | 380/30 |
| 4,405,829 | 9/1983 | Rivest et al. | 380/30 |
| 4,868,877 | 9/1989 | Fischer | 380/30 |
| 5,005,200 | 4/1991 | Fischer | 380/30 |
| 5,220,604 | 6/1993 | Gasser | 380/30 |
| 5,261,002 | 11/1993 | Perlman et al. | 380/30 |
| 5,371,794 | 12/1994 | Diffie et al. | 380/30 |
| 5,390,247 | 2/1995 | Fischer | 380/30 |
| 5,495,098 | 2/1996 | Parilles et al. | 235/492 |

OTHER PUBLICATIONS

ITU Recommendation X.509 (1993) "Information Technology—Open Systems Interconnection—The Directory: Authentication Framework".

ANSI X9.30-3 "Public Key Cryptography Using Irreversible Algorithms for the Financial Services Industry": Part 3.—Certificate Management for DSA, Nov. 19, 1994.

Memo to Canadian ISO Members, entitled "(Proposed) Canadian Contribution on Certificate Extensions", C. Ashford, Nov. 13, 1994.

ISO/IEC JTC 1/SC 21/WG 4, N 2116, "Canadian Comments on SC 21 N 8784: Working Draft for Extensions to X.509 ISO/IEC 9594-8 Certificate Definitions", ISO/IEC JTC 1—ITU-T Collaborative Meeting on Directory 12-16, Orlando, USA, Dec. 12-16, 1994.

*Primary Examiner*—Salvatore Cangialosi
*Attorney, Agent, or Firm*—Yoshiharu Toyooka

[57] ABSTRACT

A method which allows implementation of the revocation of public-key certificates facilitates engineering of certificate revocation lists (CRLs). It solves the practical problem of CRLs potentially growing to unmanageable lengths by allowing CRLs to be segmented, based on size considerations or priority considerations related to revocation reasons. The method is used to distribute CRL information to users of certificate-based public-key systems. It is also applied more generally to update any field in a certificate by reference to a secondary source of authenticated information.

20 Claims, 4 Drawing Sheets

Fig 1 subject_name
subject_public_key
validity_period
certificate_serial_number
issuing_authority
issuing_authority_signature

Fig 2 time_and_date_of_issue
{revocation_list_entry}*
issuing_authority
issuing_authority_signature revocation_list_entry=
{serial_number, revocation_date}
("*" indicates 1 or more repetitions)

Fig 3 subject_name
subject_public_key
validity_period
certificate_serial_number
address_list
issuing_authority
issuing_authority_signature address_list={CRL_address, reason_codes}*
("*" indicates 1 or more repetitions)

Fig 4 time_and_date_of_issue
{address, reason_codes}
{revocation_entry}*
issuing_authority
issuing_authority_signature revocation_entry =
{serial_number, revocation_date, revocation_reason}
("*" indicates 1 or more repetitions)

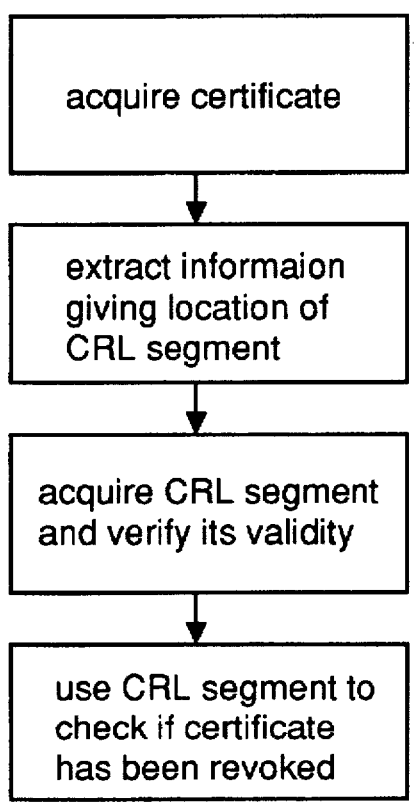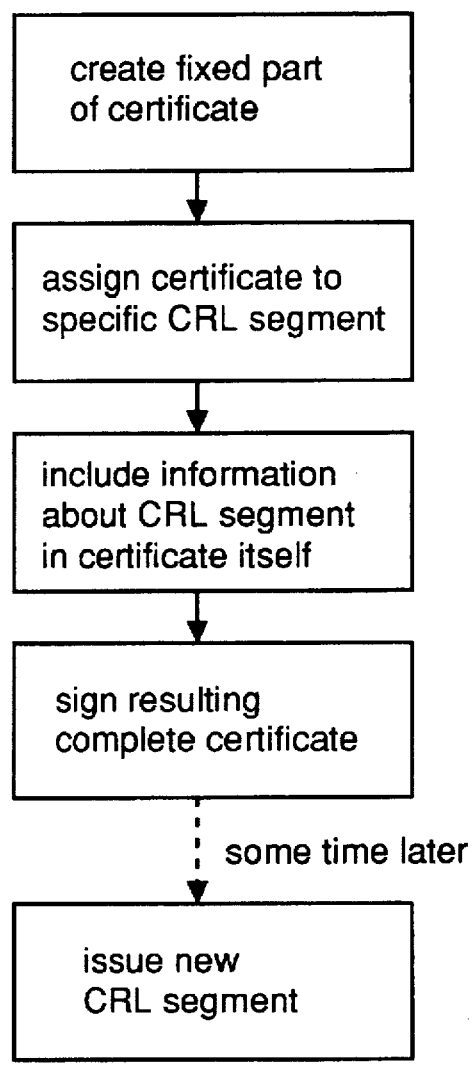
Fig 6

Actions by certificate-using component to merge update data into a certificate
Actions by certificate-creating component to create cerificates, assign and specify relevant update segments
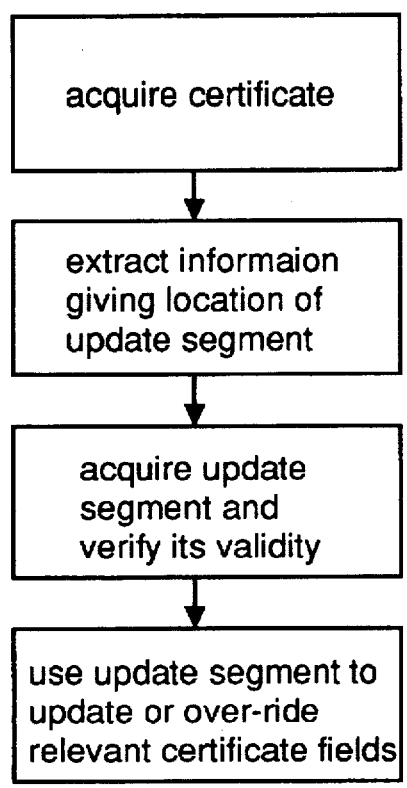
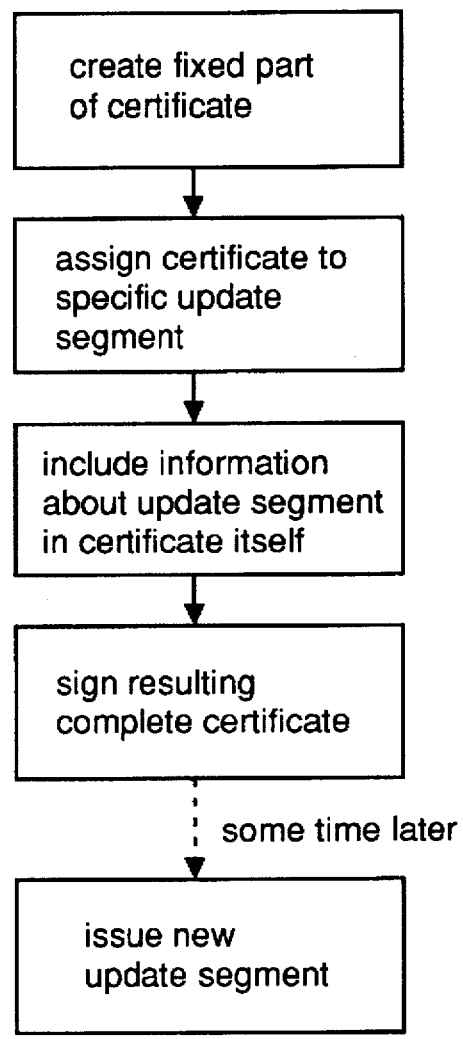
Fig 7

METHOD FOR EFFICIENT MANAGEMENT OF CERTIFICATE REVOCATION LISTS AND UPDATE INFORMATION

FIELD OF INVENTION

The invention resides generally in the field of certificate management for public-key cryptography. In particular, it is directed to a new method for managing lists of revoked certificates (certificate revocation lists), by partitioning them into smaller segments thereby allowing the maximum potential size of any one segment to be kept arbitrarily small, and allowing efficient processing of lists according to revocation reasons. The invention applies more generally to allow update of or over-ride any field in a certificate by reference to a secondary source of authenticated information.

BACKGROUND OF THE INVENTION

Public-key cryptography was introduced in 1976 (Diffie and Hellman 1976, hereafter [DH]), and now plays a major role in cryptographic solutions in the field of information security. U.S. Pat. No. 4,200,770 (Diffie et al, Apr. 29, 1980) describes the technology. The basic idea is as follows. An encryption algorithm, for example, is parameterized by a pair of related numbers, known as a private key and a public key. The public key, known to everyone, allows anyone to encrypt a message for a specific intended recipient; the private key, known only to the intended recipient, allows only that individual to decrypt the message.

Public keys are typically distributed by means of public-key certificates (ITU Recommendation X.509:1993, hereafter [X.509]). A public-key certificate consists of a user's distinguished name, the public key to be associated with that name, and the digital signature of a trusted third party (commonly called the certification authority or CA) which binds the name to the key. The certificate usually also contains additional fields, including a validity period, and a serial number which uniquely distinguishes all certificates from one certification authority. Effectively, the signature serves as the trusted party's guarantee that the key is associated with the specified user. When other system users successfully verify, using standard techniques (Rivest, Shamir and Adleman 1978, hereafter [RSA]) that a certificate signature is correct, they may then be reasonably assured that the public key in the certificate is authentic, and may safely proceed to use the public key within for appropriate cryptographic applications. U.S. Pat. No. 4,405,829 (Rivest et al, Sep. 20, 1983) describes the RSA technique.

Public key certificates are typically stored in public databases commonly referred to as directories [X.509]. The validity period in a certificate implies a default expiry date of the certificate, after which time all users should treat the binding between the key and user as invalid. If the certification authority which signed the certificate decides, for some reason (see below), to retract its endorsement of the public key prior to the normal expiry date, some method is followed to revoke the certificates. Reasons for revoking certificates may include compromise or suspected compromise of the corresponding private key, or early termination of the need for the key.

One method of certificate revocation involves use of a certificate revocation list or CRL (for example, see [X.509]). A CRL according to [X.509] consists of a list of zero or more pairs of data items, each pair indicating a certificate serial number and the time or date at which the certificate was revoked. The composite list also includes a date of issue or validity period, and is digitally signed by the certification authority to ensure authenticity. In prior art, there is typically a single CRL associated with a certification authority, and the CRL is updated at regular intervals (e.g. daily or weekly). Before extracting for use any public key from a certificate, prudent system users verify the signature on the certificate, that the current time precedes the expiry date therein, and that the serial number of the certificate in question does not appear on the most recent valid CRL.

While ideally CRLs are small lists, they may potentially be required to contain as many data items as the number of outstanding certificates in a system. CRLs may grow large under many circumstances, e.g. in environments in which certificates are revoked whenever personnel change jobs or job roles. Large CRLs are a practical concern in systems supporting very large numbers of users. The size of CRLs is a particular concern in systems which require that CRLs be retrieved under the following conditions: from public directories; over low-bandwidth channels; and/or on a frequent basis. The situation is increasingly problematic in systems requiring that several CRLs be checked in order to verify a single public key, such as in the case when chains of certificates must be verified, e.g. as per ITU Recommendation X.509.

OBJECTS OF THE INVENTION

It is therefore an object of the invention to provide a method of changing or updating one or more data items in a certificate.

It is a further object of the invention to provide a method whereby additional information regarding a public key can be found in a secondary location which can be determined from information within the certificate.

It is yet another object of the invention to provide a method of changing or updating one or more data items in a certificate in systems where certificate distribution or replacement is difficult, or less efficient than, selectively providing supplementary additional or updated information.

It is another object of the invention to provide a mechanism for segmenting a certificate revocation list (CRL) into an arbitrary number of smaller lists (CRL segments), so as to allow CRL checking similar to prior art, but allowing the size of each individual CRL to be limited to any practical size, including possibly only a single entry.

It is still a further object of the invention to provide an efficient method of selective processing and use of CRLs by means of prioritized CRLs.

SUMMARY OF THE INVENTION

Briefly stated, the invention resides in a secure telecommunication system which includes a certification authority or other entities directly or indirectly authorized by the certification authority for digitally issuing a certificate. According to one aspect, the invention is directed to a method of conveying additional information which specifies changes or updates over-riding data items within the certificate. The method comprises steps of: (i) extracting from the certificate accessing information which directly or indirectly specifies how the additional information may be obtained; (ii) verifying the authenticity of the additional information through standard techniques including digital signature verification; and (iii) using the verified information to modify or update the data items in the certificate.

BRIEF DESCRIPTION OF THE DRAWINGS

FIGS. 1 and 2 are illustrative examples of certificate and CRL formats respectively, according to prior art, e.g. [X.509];

FIGS. 3 and 4 are illustrative examples of a certificate and CRL respectively, according to embodiments of the invention;

FIGS. 6 and 7 represent parts of the embodiment of the invention used in certificate-using components and certificate generating components of the system.

DETAILED DESCRIPTION OF PREFERRED EMBODIMENTS OF THE INVENTION

Figure 5:
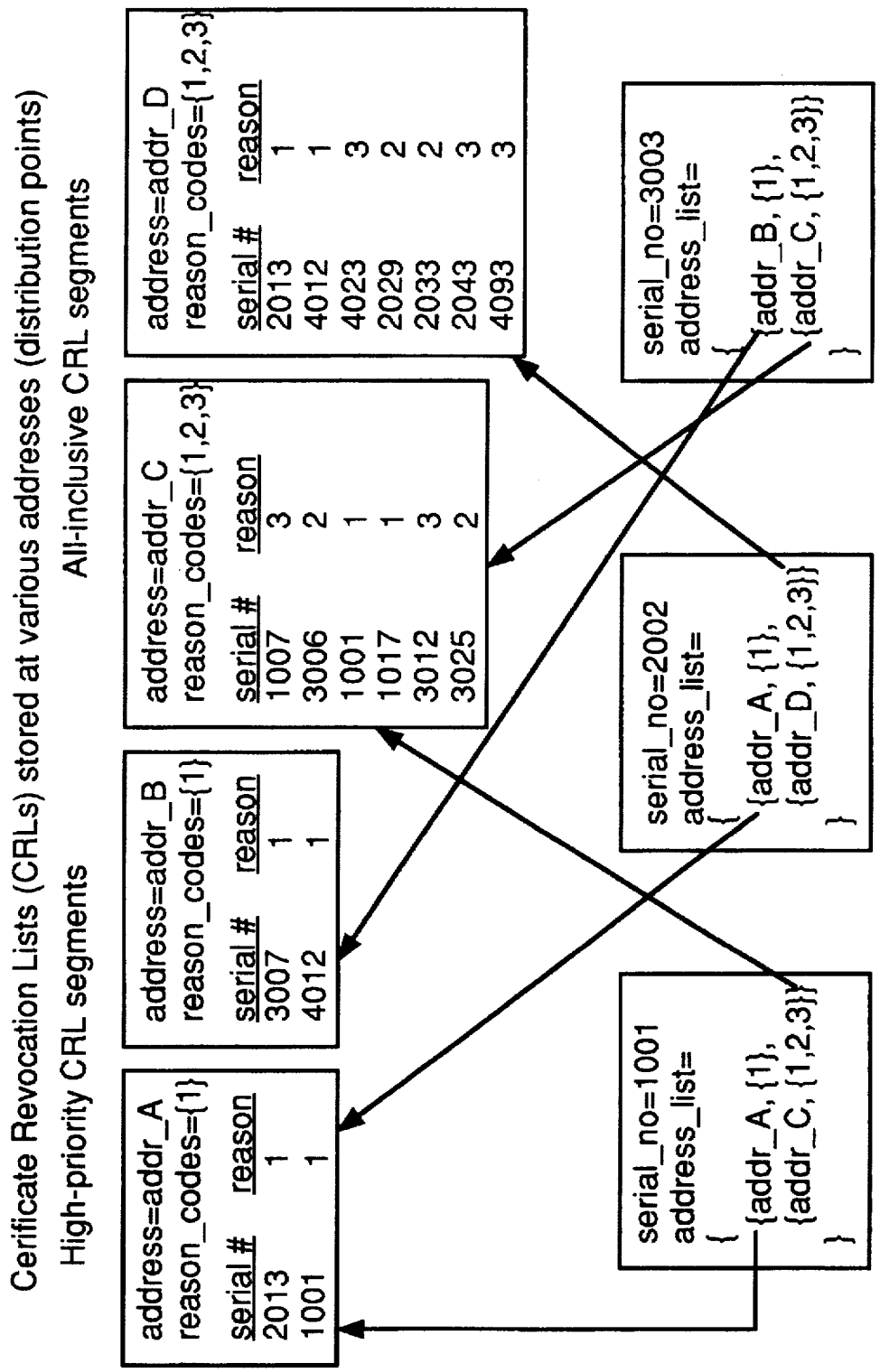
FIG. 5 is an example illustrating the use of the method of segmented CRLs according to one embodiment of the invention.

The invention consists of an implementable mechanism motivated by, and meeting either (but preferably both) of the following objectives:

1. to allow an upper limit to be imposed on the size of a CRL;
2. to allow a distinction to be made between different instances of revoked certificates, based on the severity of the reasons for revocation.

The second point of interest is to allow, for example, critical revocation lists (e.g. those certificates revoked for the reason of compromise of secret keying material) to potentially be distributed by different means, and at a different frequency, than less critical revocation lists. The invention meets both of the above objectives, as will be explained.

Different (possibly non-disjoint) subsets of the set of all certificates issued by one certification authority are assigned to different CRLs, by assigning to each certificate one or more CRL segments, the location of which (referred to as a CRL distribution point) is specified in the particular certificate. A distribution point is a location which may serve as a readable data store (e.g. an entry in the directory), designated to contain a CRL segment. The segment associated with a particular certificate is designated to contain the revocation entry for that certificate (and possibly also for other certificates) should that certificate (ever) be revoked. In one extreme case of usage, each certificate may be associated with a distinct distribution point. More generally, each CRL segment is engineered to be able to accommodate a subset of the set of all certificates issued by a given CA. A particular certificate may also appear on two or more different CRL segments associated with the same revocation reasons, or an overlapping set of revocation reasons; this redundancy allows fault tolerance in the case that some CRL segments become unavailable, for unexpected reasons.

Different CRLs (corresponding to specific sets of revocation reasons) are used. Examples of reasons include compromise of private or secret keys (which may imply a significant risk of private key misuse), and revocations resulting from routine binding terminations such as when keys are simply no longer needed (and which generally imply no significant risk of private key misuse).

The invention pertains to public-key certificates where the public key may be of any type, including an encryption or signature public key [RSA], a key agreement public key (e.g. Diffie-Hellman key agreement [DH]), a public key used for entity authentication, etc. The invention also pertains to attribute certificates (see draft ANSI X9.30-3, November 1994, Public Key Cryptography Using Irreversible Algorithms for the Financial Services Industry: Certificate Management for DSA; proposed to become ANSI X9.57), which are used for certifying non-secret data ("attributes") other than public keys. An attribute certificate may be associated with a public-key certificate by including the serial number of the latter. Examples of items specified in attribute certificates include information related to authorization and liability in financial transactions.

In essence, the invention provides a method whereby additional information regarding a public key, for example its revocation status, can be found in a secondary location (one other than on the certificate itself) which can be determined from information within the certificate. The certificate proper can thus be viewed as a "fixed part" of the information about a public key, and the secondary location a "variable part" which can be updated without updating individual certificates or the signatures thereon. The variable part should be signed by the same certification authority which signed the original certificate, or by an authority which has been authorized by this first authority; and before this data can be accepted as valid, this signature should be verified. The advantage of this schema is the flexibility and efficiency offered by changing only the variable part, in particular when there are n certificates and m secondary parts, and it is expected that m is significantly less than n. Here a large number of certificates are associated with, and effectively share, a small number of secondary parts; and a particular secondary part may be associated with more than one certificate.

The invention includes the application of the idea of the preceding paragraph to all items included in a certificate. The general invention is one of using a secondary list as a "delta" mechanism to update information in certificates. Revocation status as described above is a primary example. A second example is validity date. A third is a change to the distinguished name of an entity specified in a certificate. Similarly, other applications exist. The general invention is of use in systems where certificate distribution or replacement is difficult, or less efficient than, updating a "delta" list. This differs from, and is much more powerful than, a simpler idea hereafter called delta CRLs. A delta CRL is a list identifying the serial numbers of (only) those certificates which have been revoked subsequent to the date of the most recent previously issued such revocation list. A delta CRL can be used to update a previously current CRL by adding the newly revoked certificates thereto. Delta CRLs are specific to the property of revocation, pertain to a single CRL whose location is not explicitly specified, and apply universally to all certificates within a certificate system.

As a further exposition of the application of this idea to validity dates, a field may be incorporated into a certificate indicating the location at which additional date-validity information regarding this certificate may be found. A list (validity-list or validity-segment, analogous to CRLs above) may then be used to specify a date replacing, or in addition to, the validity date on either a particular certificate (identified by serial number, for example), a subset of certificates, or all certificates associated with the segment in question. In the case of a validity date in both a certificate and on the validity-segment for the same certificate, a resolution policy for deciding the over-riding date is used (e.g. that in the validity-segment, or that which is earlier in time). As an illustrative example, a set of certificates with serial numbers 1 through 100 could all include fields specifying the same validity-segment X indicating an expiry date of Jan. 1 1996. If the relevant certification authority wishes to extend the validity period of all these certificates to Jan. 1 1997, it could do so by creating and signing a single updated validity segment X' made available at the specified location, and specifying in a single entry the new expiry date and "ALL" as the qualifier on the set of certificates to which the new date applies.

The invention may be used in conjunction with existing systems which use a single CRL. The latter may be viewed as a special case in which all certificates are associated with the same (single) CRL segment. In general, it is envisioned that CRLs are signed by the certification authority's single signature key, and distribution points do not have their own key pairs. In other embodiments of the invention, separate keys might be used for different CRL segments, perhaps associated with different distribution points.

The invention is most easily described relative to any existing certificate-based public-key system, and involves the inclusion of the following additional fields in the specified data structures:

1. in a certificate, a field (address_list) identifying one or more particular CRL segments, and sufficient information allowing these to be obtained;
2. in a CRL, a composite field ({address, reason_codes} address (or equivalent information) where this CRL (now a CRL segment) is intended to be located, and the set of revocation reasons associated with this segment.

The address_list field is a list of values identifying, explicitly or implicitly, one or more distribution points at which a CRL associated with the certificate in question may be found. An application using the certificate may obtain from this location a CRL, to ascertain if the certificate in question has been revoked.

In one embodiment, this address_list contains a single entry, giving reference to a distribution point defined to contain any certificate revocation for this certificate, regardless of the revocation reason. In another embodiment, this field contains a list with multiple entries, the first being as above, and additional entries which respectively indicate distribution points at which reason-specific CRL segments may be found. A reason-specific CRL segment is a CRL segment restricted to contain entries corresponding to certificates revoked for only a limited subset of the set of all defined revocation reasons (e.g. for the reason of compromise of a private key). In a further embodiment, the address_list field value embedded in a certificate is the one-way hash of a (typically longer) address_list value; this allows some savings in storage.

Referring to the accompanying drawings, one preferred embodiment is illustrated in detail. FIGS. 1 and 2 show prior art certificate and CRL formats respectively. FIG. 3 and 4 show certificate and CRL formats, respectively, according to embodiments of the invention which include added fields shown in bold. The added field in FIG. 3 is: address_list= {CRL_address, reason_codes}*. Here "*" indicates the one or more entries of the indicated form. CRL_address is a value indicating a location at which a CRL segment may be found. A network address, filename address, database directory entry address, or the like can be used for this purpose. Reason_codes indicates the subset of revocation reasons for which certificates whose serial numbers on that CRL segment have been revoked; this may be a single reason, a set of two or more reasons, or a value denoting all reasons.

In FIG. 4, a new field {address, reason_codes} is added. For a given CRL segment X, the first part of this new field specifies the distribution point at which X is intended to be made available. One purpose of this field is to prevent otherwise authentic CRL segments from being moved around, by malicious parties, from one distribution point to another, for example in the case the CRL segment at one distribution point site is empty, while at another is not. An application using X should check that the location at which X is found matches that which is specified internally by the address field within X itself. If a CRL segment is a reason specific CRL segment, the revocation_list_entry of prior art becomes a revocation_entry which contains a new entry called "revocation_reason" in addition to serial number and revocation date. For example:

revocation_entry={serial_number, revocation_date, revocation_reason}

FIGS. 5–7 are charts illustrating actions which will be taken by various components according to an embodiment of the invention. It should be noted that in FIG. 5, the only fields shown in CRLs are the CRL address and reasons codes, along with the list of {serial number, reason_codes} entries for revoked certificates on that list. Also, only serial numbers and data allowing location of CRL segments are shown in certificates.

In summing up, the major advantage of the invention is to be able to control, or engineer, the size of a CRL segment. A further advantage is to allow different CRL segments to be consulted depending on the severity of the revocation reason, thereby allowing CRL segments to be classified and processed by prioritized reasons.

What is claimed is:

1. In a secure telecommunication system which includes an authorization agent such as a certification authority and other entities authorized by said certification authority for digitally issuing a certificate, a method of conveying additional information which alters actions taken by a system processing said certificate, comprising steps of:

i) storing additional information at a plurality of data storage locations;

ii) extracting from said certificate accessing information which specifies how said additional information is to be obtained;

iii) verifying the authenticity of said additional information through digital verifying techniques such as digital signature verification;

iv) processing said verified additional information obtained from any of the plurality of data storage locations; and v) performing on said certificate the action altered by the additional information.

2. The method according to claim 1, wherein the additional information is related to the validity of a certificate, conditions for the validity including any of certificate revocation, a validity period specified by a starting and ending date and other relevant information, and any alteration of such conditions.

3. The method according to claim 2 wherein the validity conditions are verified by the use of CRLs.

4. The method according to claim 3, wherein a CRL is segmented and a list of revoked certificates corresponding to a particular authorization agent is separated into at least one CRL segment whose content is stored in one of the plurality of data storage locations, and each certificate contains at least one location indicator which indicates associated CRL segment.

5. The method according to claim 4, wherein at least one CRL segment corresponds to at least one revocation reason.

6. The method according to claim 5, wherein the location indicator specifies a field in an entry in a database.

7. The method according to claim 5, wherein the certificate is of the format as specified in X.509 and the location indicator is an additional field in the certificate.

8. The method according to claim 5, wherein the format of CRLs and CRL segments is that specified in X.509 with an added field within the CRL itself specifying any of the location indicator of the CRL segment and the reason codes associated with this particular CRL segment.

9. The method according to claim, wherein the certificate is a public-key certificate for any type of public key, including Diffie-Hellman public keys.

10. The method according to claim 5, wherein the certificate is for an attribute other than a public key.

11. The method according to claim 5, wherein CRL segments at at least one distribution point are signed by any of a common certification authority key and segment keys authorized by the certification authority which issued the certificate.

12. The method according to claim 5, wherein a particular certificate appears on a plurality of different CRL segments associated with any of the same revocation reasons and an overlapping set of revocation reasons.

13. The method according to claim 5 wherein a CRL segment is indicated indirectly from information embedded in the certificate and the certificate includes a compressed representation such as hash of a more complete specification of information, linkable thereto.

14. The method according to claim 5 wherein a CRL segment is indicated by an explicit address.

15. The method according to claim 5 wherein the method of indicating a CRL segment can be determined indirectly from information embedded in the certificate, the embedded information being represented by a compressed representation, such as the result of one-way hash.

16. The method according to claim 5, wherein at least one revocation reason is specified in the CRL segment.

17. The method according to claim 6, wherein the database is a directory and the entry includes a CRL attribute of an entry in an X.509directory.

18. The method according to claim 5, wherein the certificate is of the format similar to that specified in X.509 and the location indicator is an additional field in the certificate.

19. The method according to claim 5, wherein the format of CRLs and CRL segments is similar to that specified in X.509, with an added field within the CRL itself specifying any of the location of the CRL segment and the reason codes associated with this particular CRL segment.

20. The method according to claim 14 wherein an explicit address is any of a network address, filename address, and database directory entry address.

* * * * *